US010015297B2

(12) United States Patent
Hooton et al.

(10) Patent No.: US 10,015,297 B2
(45) Date of Patent: Jul. 3, 2018

(54) DISPLAY COVER RETENTION FEATURES FOR A PORTABLE ELECTRONIC DEVICE

(71) Applicant: Apple Inc., Cupertino, CA (US)

(72) Inventors: Lee E. Hooton, Cupertino, CA (US); Daniel W. Jarvis, Sunnyvale, CA (US); Marwan Rammah, Cupertino, CA (US); Ian A. Spraggs, San Francisco, CA (US); Nicholas G. Merz, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/260,222

(22) Filed: Sep. 8, 2016

(65) Prior Publication Data

US 2017/0071064 A1    Mar. 9, 2017

Related U.S. Application Data

(60) Provisional application No. 62/215,531, filed on Sep. 8, 2015.

(51) Int. Cl.
*B32B 3/02* (2006.01)
*H04M 1/02* (2006.01)
*G06F 1/16* (2006.01)

(52) U.S. Cl.
CPC ........ *H04M 1/0266* (2013.01); *G06F 1/1613* (2013.01); *H04M 1/0249* (2013.01)

(58) Field of Classification Search
CPC .......................... H04M 1/0249; H04M 1/0266
See application file for complete search history.

(56) References Cited

U.S. PATENT DOCUMENTS

| 6,630,228 | B1 | 10/2003 | Jarnebrink et al. | |
|---|---|---|---|---|
| 9,154,678 | B2 | 10/2015 | Kwong et al. | |
| 2011/0050053 | A1 | 3/2011 | Deng | |
| 2014/0178647 | A1* | 6/2014 | Kim | B44C 5/0407 |
| | | | | 428/166 |
| 2015/0116268 | A1 | 4/2015 | Shedletsky et al. | |
| 2015/0248142 | A1* | 9/2015 | Qian | B32B 7/12 |
| | | | | 361/679.26 |
| 2015/0378458 | A1* | 12/2015 | Lai | G06F 3/041 |
| | | | | 345/174 |
| 2016/0016845 | A1* | 1/2016 | Cho | C03C 15/00 |
| | | | | 428/157 |
| 2016/0070397 | A1* | 3/2016 | Su | G06F 3/044 |
| | | | | 345/173 |

(Continued)

*Primary Examiner* — Elizabeth E Mulvaney
(74) *Attorney, Agent, or Firm* — Dickinson Wright RLLP

(57) ABSTRACT

An electronic device having a cover glass secured with a frame is disclosed. The electronic device includes a masking layer positioned between the cover glass and the frame. The masking layer may include several ink layers. The pigment composition of one of the ink layers may be altered in order to improve an adhesive bond between the ink layer and the cover glass. The frame can be modified to enhance an adhesive bond between the masking layer and the frame. For example, the frame can be altered to include a porous region to increase the surface area of the frame such that the adhesive can bond to the additional surface area. The frame may also include an extension, or rib, that may increase the surface area of the frame that receives an adhesive. The frame may include an opening or a cavity that assists in assembly between an insert-molded feature.

20 Claims, 10 Drawing Sheets

(56) References Cited

U.S. PATENT DOCUMENTS

2016/0185101 A1* 6/2016 Lee .................. B41M 1/18
              428/195.1
2016/0239118 A1* 8/2016 Yoon ................ G06F 3/041
2017/0177032 A1* 6/2017 Cheng ............... G06F 1/1637

* cited by examiner

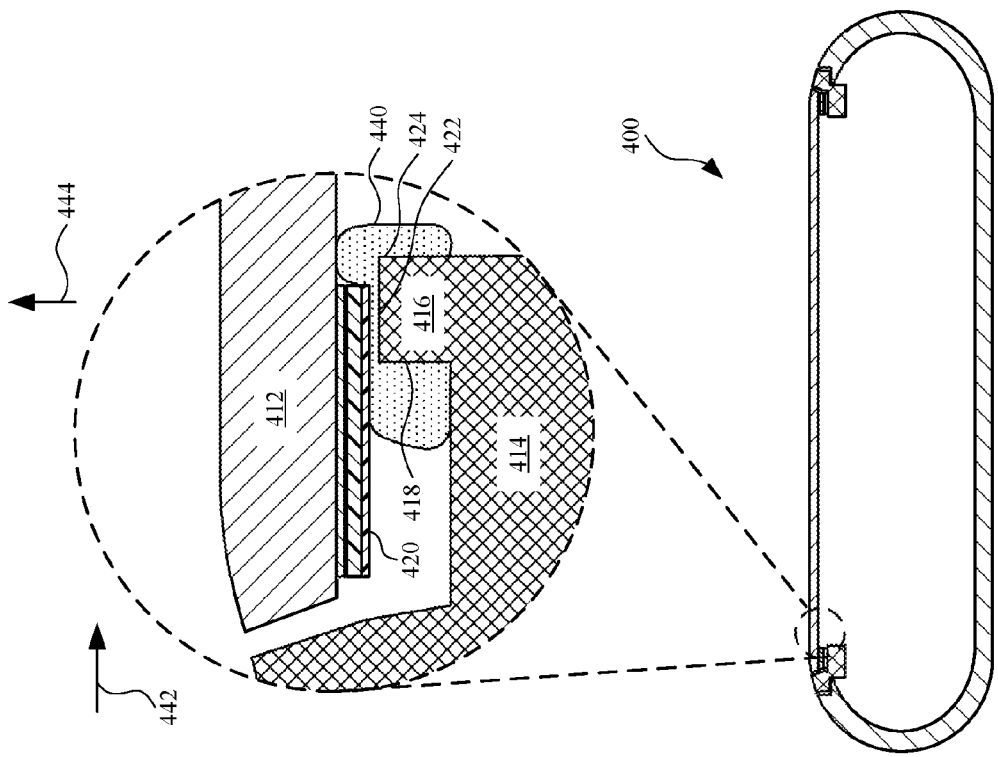
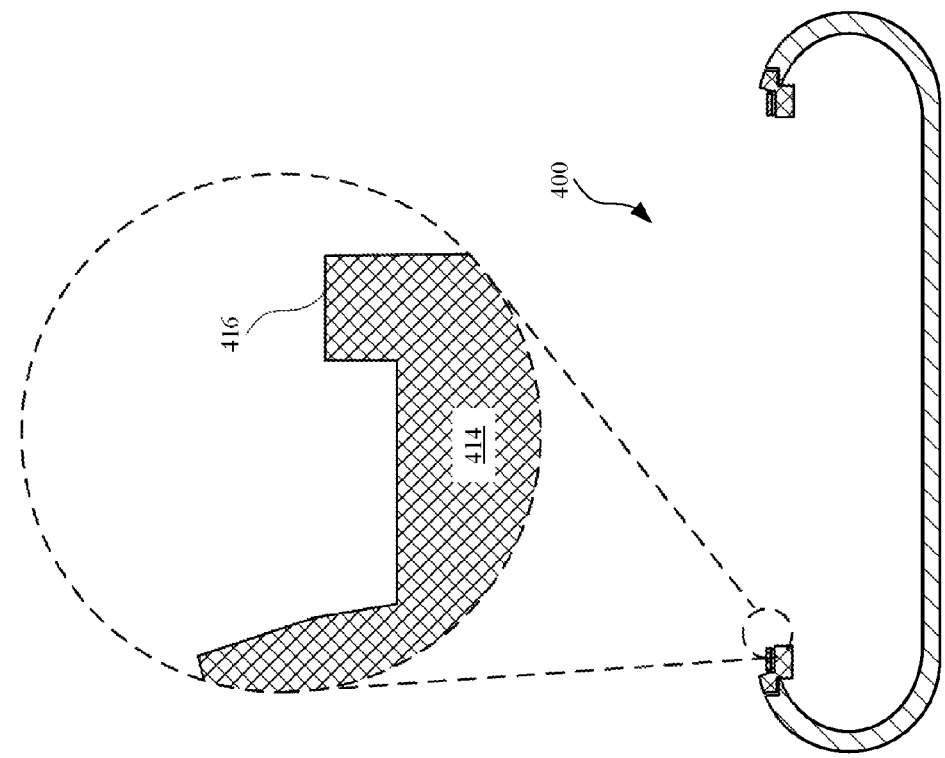

US 10,015,297 B2

DISPLAY COVER RETENTION FEATURES FOR A PORTABLE ELECTRONIC DEVICE

CROSS-REFERENCE TO RELATED APPLICATION(S)

This application claims the benefit of priority under 35 U.S.C. § 119(e) to U.S. Provisional Application No. 62/215,531, filed on Sep. 8, 2015, and titled "DISPLAY COVER RETENTION FEATURES FOR A PORTABLE ELECTRONIC DEVICE," the disclosure of which is incorporated herein by reference in its entirety.

FIELD

The following description relates to an electronic device. In particular, the following description relates to techniques used to adhere a display cover, such as a cover glass, with a frame used to support the display cover. The adhesions techniques can be based in part on the aesthetic appearance of the electronic device.

BACKGROUND

Electronic device may include a cover glass secured with an enclosure to house several components. A frame may be used to secure the cover glass with the enclosure, and may also be positioned between the cover glass and the enclosure. In some cases, the cover glass includes a material applied to the cover glass and positioned between the cover glass and the enclosure. Also, the material can include opaque properties to minimize or prevent light from passing between the cover glass and the enclosure.

However, the material includes some drawbacks. For example, the material may reduce an adhesive bond between the cover glass and the frame, thereby increasing the likelihood of the cover glass delaminating from, or becoming unsecured with, the frame in the event of a load or force to the electronic device. As a result, the cover glass is susceptible to becoming detached from the electronic device.

SUMMARY

In one aspect, an electronic device having a first part and a second part secured with the first part is described. The electronic device may include a masking layer positioned at an interface between the first part and the second part to prevent light transmission through the interface. The masking layer may include a first layer including a first composition having a first type pigment. The masking layer may further include a second layer including a second composition having the first type pigment. The second composition may be different from the first composition.

In another aspect, an electronic device having a display assembly and a display frame bordering the display assembly is described. The electronic device may include a protective cover assembly overlaying the display assembly and the display frame. The electronic device may further include a cover support member having a support surface that receives an adhesive layer to secure the cover support member with the protective cover. The support surface may include a porous region that receives the adhesive layer. The electronic device may further include a masking layer positioned at an interface between the protective cover and the cover support member to prevent light transmission through the interface.

In another aspect, a method for assembling an electronic device having a first part and a second part secured with the first part is described. The method may include disposing a first layer along the first part. The first layer may include a first composition having a first type pigment. The method may further include disposing a second layer on the first layer. The second layer may include a second composition having the first type pigment. Also, the second composition may be different from the first composition. In some embodiments, the first layer and the second layer combine to define a masking layer at an interface between the first part and the second part to prevent light transmission through the interface.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which:

FIG. 9 illustrates a cross sectional view of an electronic device, showing a cover support member having a rib extending from the cover support member;

FIG. 10 illustrates a cross sectional view of the electronic device shown in FIG. 9, further showing a protective cover adhesively secured with the cover support member;

Figure 1:
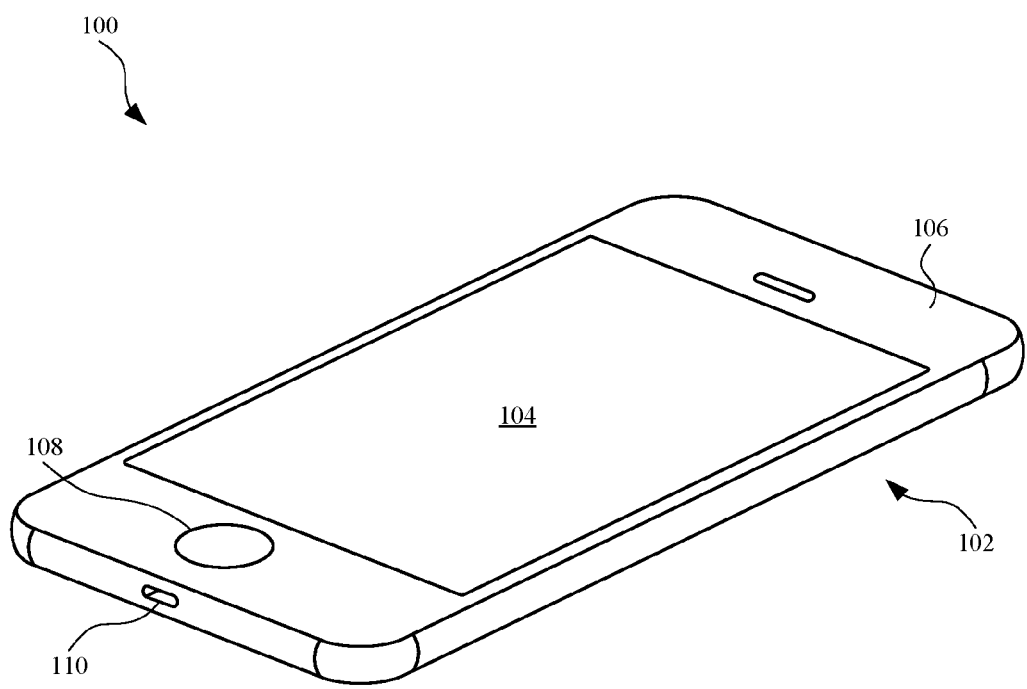
FIG. 1 illustrates an isometric view of an embodiment of an electronic device, in accordance with the described embodiments.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The following disclosure relates to an electronic device having an enhanced adhesive masking layer between a protective cover and a frame that carries the protective cover. The protective cover may include a transparent layer that overlays and protects a display assembly of the electronic device. In order to prevent light transmission between the protective cover and the frame, the protective cover may receive several layers of material designed to provide an opaque mask, as well as enhance an appearance of the electronic device. Regarding the latter, the masking layer may include an appearance, in terms of color, similar to that of a display frame that borders the display assembly. Also, the masking layer can hide or obscure a location between the protective cover and the frame in order to cover an adhesive layer, for example, used in conjunction with the masking layer.

In some embodiments, the masking layer includes several layers of ink. Each ink layer may include pigments that define the color of the ink, and accordingly, define the color of the layer. While the pigments contribute to the appearance of the ink layer, and in turn, the electronic device, the pigments provide the ink layer with relatively little adhesive forces to bond the mask to the protective cover, even when the ink layer includes some resin material. Accordingly, a force exerted on the electronic device may cause masking layer to tear, or otherwise become removed, from the structural component.

In order to strengthen the adhesive bond of the masking layer to the protective cover, the ratio of pigments to resin of some layers can be altered. For example, the masking layer may include at least one ink layer designated as a bonding layer that bonds directly to the structural component. The bonding layer can include additional resin as well as a reduced amount of pigments. Accordingly, the bonding layer includes a relatively high resin-to-pigment ratio (or conversely, a relatively low pigment-to-resin ratio) as compared to the remaining layers of the masking layer. Due to the increased resin material, the masking layer may include an enhanced adhesive bond with the protective cover by way of the bonding layer. However, the bonding layer, having fewer pigments, results in less overall pigmentation of the masking layer, and accordingly, the appearance of the bonding layer, in terms of color, is reduced. In this regard, the masking layer may include additional layers of relatively high pigment-to-resin layers that compensate for the bonding layer to enhance both the appearance of the masking layer and the light blocking capabilities of the masking layer.

In addition to altering the ink, the frame may include modifications to enhance a bond with an adhesive layer applied to the frame that is used to bond with the masking layer, and in some cases, the masking layer and the protective cover. For example, prior to adding the adhesive layer, the frame may be pre-treated with a primer agent that alters a surface energy, or surface tension, of the frame to enhance a bond with the adhesive layer. In this regard, the frame may become relatively porous, which allows the adhesive layer to extend through to least some of the porous regions. The bond may include a chemical bond that is improved by the primer agent.

Alternatively, or in combination, a mold cavity (used to mold the frame) may be modified in order to increase a surface roughness of the frame. An electrical discharge machining ("EDM") operation, which can also include chemical etching, can be used on the mold cavity to change one or more surfaces of the mold cavity, which in turn changes one or more corresponding surfaces of the frame.

The frame may also be modified in order to provide additional surface area with which the adhesive layer may bond. For example, the frame may include a rib or extension that protrudes in a direction toward the protective cover. The adhesive layer may be applied or disposed at a location corresponding to the rib. Then, when the protective cover (or ink layer, if applicable) engages the frame, the adhesive layer extends across multiple surfaces (both horizontal and vertical) of the rib and cures. In this manner, the adhesive layer is bonded to multiple surfaces of the rib, creating a bond that resists at least some lateral or shear forces exerted on the electronic device. Accordingly, the adhesive bond may enhance resistance against a load or force to the protective cover, as the tensile strength of the adhesive bond may counteract the load or force to the protective cover.

Also, the frame may include additional modifications. For example, the frame may include several cavities, or wells, in the frame designed to receive an additional adhesive layer (or layers) that fill the cavities to create regions of greater adhesive thickness. The resultant shape of the adhesive, based in part on the shape of the cavities, may create adhesive protrusions that to resist delamination, or uncoupling, between the frame and the protective cover.

These and other embodiments are discussed below with reference to FIGS. 1-14. However, those skilled in the art will readily appreciate that the detailed description given herein with respect to these Figures is for explanatory purposes only and should not be construed as limiting.

FIG. 1 illustrates an isometric view of an embodiment of an electronic device 100, in accordance with the described embodiments. In some embodiments, the electronic device 100 is a tablet device. In the embodiment shown in FIG. 1, the electronic device 100 is a mobile communication device, such as a smartphone. The electronic device 100 may include an enclosure 102 designed to enclose several operational components (not shown), including integrated processor circuits, memory circuits, a speaker, a microphone, etc.

In some embodiments, the enclosure 102 is formed from a metal, such as aluminum. The enclosure 102 may include a rear portion and several sidewalls extending from the rear portion to define an internal cavity to receive the operational components.

The electronic device 100 may further include a display assembly 104 designed to display visual content. The display assembly 104 may include a touch-sensitive layer (not shown) integrated with the display assembly 104 such that the display assembly 104 may receive and respond to a touch input by a user. Further, the touch-sensitive layer may include a capacitive touch sensitive layer that may receive and respond to a capacitive coupling with the capacitive touch sensitive layer. A display frame 106 may surround the display assembly 104. The display frame 106 may enhance an overall appearance of the electronic device 100 by providing a border around the display assembly 104 to cover one or more components. Further, the appearance, including color, of the display frame 106 may vary in order to provide an electronic device of different appearances, allowing a user to select one of several appearances. Although not labeled, a protective cover may overlay the display assembly 104 and the display frame 106. The protective cover may include a transparent material, such as glass or sapphire as non-limiting examples, which provides a light-transmissible outer protective layer.

Also, the electronic device 100 may further include a button 108 designed to receive an additional input allowing a user to provide a control to the electronic device 100 that controls, for example, a software application or "app" visually presented on the display assembly 104. The electronic device 100 may include an internal power source (such a battery) used to provide power in the form of electrical current to several operational components of the electronic device 100. Accordingly, the electronic device 100 may include a charging port 110 designed to receive power in order to provide power to the internal power supply and/or the operational components. Also, although not shown, the electronic device 100 may include one or more control inputs (such as button) disposed in various locations along the enclosure 102, with the control inputs offering different control features for the electronic device 100.

Figure 2:
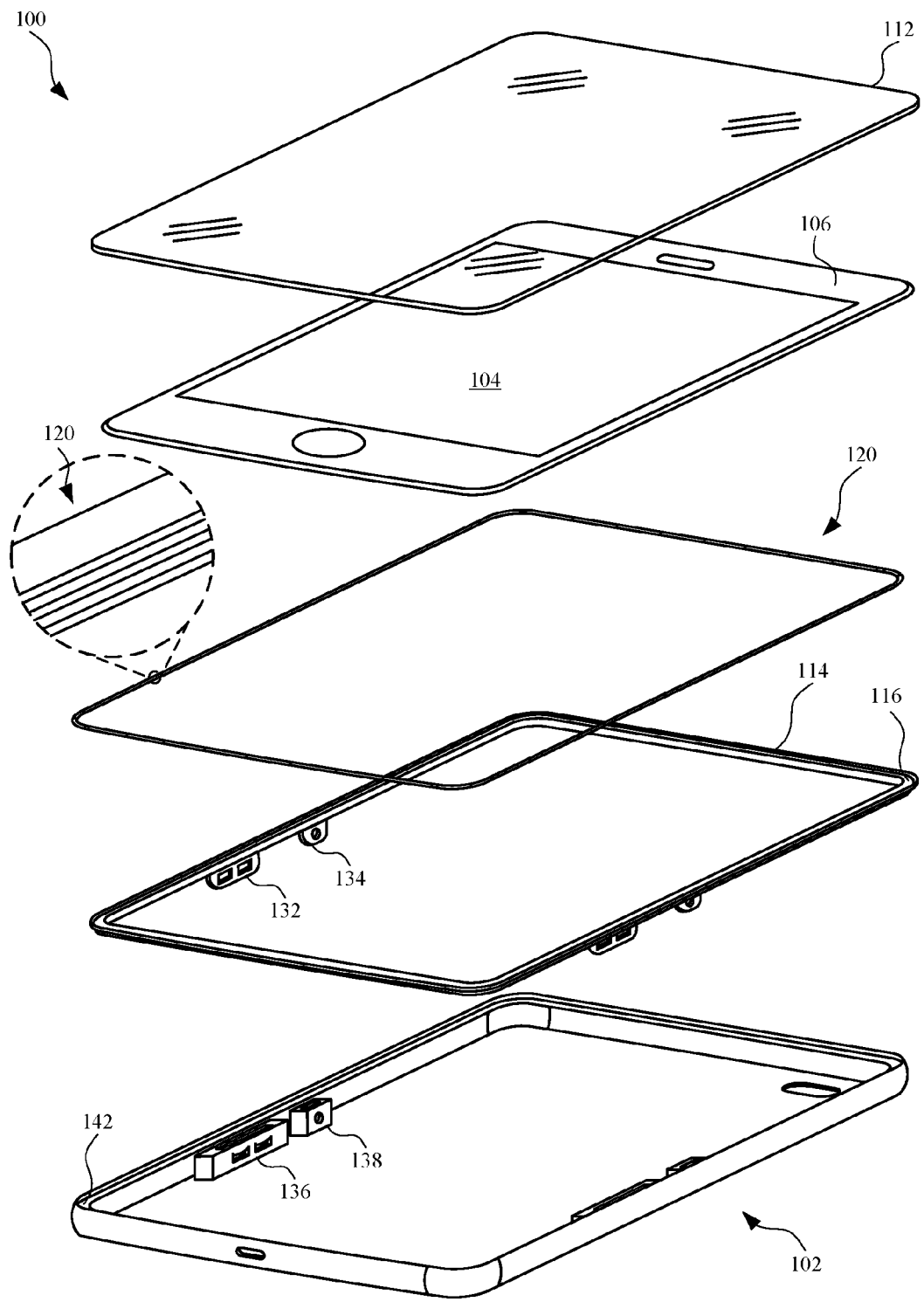
FIG. 2 illustrates an exploded view of the electronic device shown in FIG. 1, showing several internal features of the electronic device.

FIG. 2 illustrates an exploded view of the electronic device 100 shown in FIG. 1, showing several internal features of the electronic device 100. For purposes of simplicity and illustration, several feature of the electronic device 100 are removed. As shown, the display frame 106 may provide border around the display assembly 104. The display frame 106 may come in a variety of appearances. For example, in some embodiments, the display frame 106 includes an appearance of a white display frame. In other words, the display frame 106 is white in color. In other embodiments, the display frame 106 includes an appearance of a black display frame. Other appearances are possible.

Also, the display assembly 104 and the display frame 106 may be overlaid by a protective cover 112, which may be formed from a transparent material, such as glass or sapphire. When the electronic device 100 is assembled, the protective cover 112 can be seated on a cover support member 114. The cover support member 114 may be referred to as a frame that provides structural support for the display assembly 104, the display frame 106, and/or the protective cover 112. In some embodiments, the cover support member 114 includes a polymeric material, such as plastic. Also, the cover support member 114 may include a support surface 116 designed to receive the protective cover 112. In some embodiments, the protective cover 112 is bonded with the cover support member 114 at the support surface 116 by an adhesive layer (not shown).

As shown in the enlarged view, the electronic device 100 may include a masking layer 120. The masking layer 120 exaggerated in size and enlarged in FIG. 2 for purposes of illustration. The masking layer 120 may be positioned at an interface between the protective cover 112 and the cover support member 114. In some embodiments, the masking layer 120 includes several layers applied to a rear portion (not shown) of the protective cover 112. Further, each layer of the masking layer 120 may be applied by a screen-printing operation, as a non-limiting example. In this regard, in some embodiments, the masking layer 120 includes several layers of ink, or ink-based materials. Also, the masking layer 120 may provide an opaque masking feature that limits or prevents light from passing between the protective cover 112 and the cover support member 114. Each of the layers may include a composition of pigments to define the color of each layer, and also a resin material to provide bonding energy between the pigments. However, in some embodiments, the composition of at least one of the layers differs from the remaining layers by, for example, having an increased amount of resin material and fewer pigments. This will described below.

Also, the cover support member 114 may include several features protruding from the cover support member 114, and designed to engage with features of the enclosure 102 to secure the cover support member 114 with the enclosure 102. For example, a first attachment feature 132 and a second attachment feature 134 may be partially embedded in the cover support member 114 and designed to couple with a first securing feature 136 and a second securing feature 138, respectively, of the enclosure 102. In some embodiments, the first attachment feature 132 and the second attachment feature 134 are formed from a metal. Further, the first attachment feature 132 and the second attachment feature 134 may be insert-molded into the cover support member 114, which may include molding the cover support member 114 and inserting the first attachment feature 132 and the second attachment feature 134 prior to curing the cover support member 114. This will be discussed below.

Also, as shown in FIG. 2, the enclosure 102 may include a support surface 142 that receives the cover support member 114. When the protective cover 112 is secured with the cover support member 114, with the masking layer 120 positioned between the protective cover 112 and the cover support member 114, the cover support member 114 may be adhesively secured with the enclosure 102 at a location defined by the support surface 142.

Figure 3:
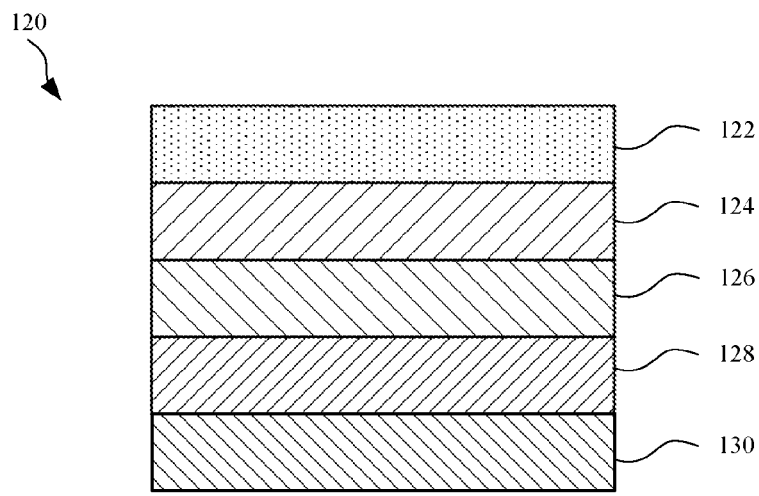
FIG. 3 illustrates a cross sectional view of the masking layer shown in FIG. 2, showing various layers of the masking layer, in accordance with the described embodiments.

FIG. 3 illustrates a cross sectional view of the masking layer 120 shown in FIG. 2, showing various layers of the masking layer, in accordance with the described embodiments. The masking layer 120 may include a first layer 122. The first layer 122 may be referred to as an uppermost layer of the masking layer 120 designed to bond with the protective cover 112 (shown in FIG. 2). The masking layer 120 may further include a second layer 124 secured with the first layer 122. The first layer 122 and the second layer 124 may include ink material, or some other pigmented material. Accordingly, the color of the first layer 122 and the second layer 124 may be determined by a pigmentation applied to the ink used to form the first layer 122 and the second layer 124. The layers may be referred to as cosmetic layers based in part on their matching appearance with that of the display frame 106 (shown in FIG. 2). In this regard, in some embodiments, the first layer 122 and the second layer 124 may include a color substantially similar to that of the display frame 106. For example, in some embodiments, the display frame 106, the first layer 122, and the second layer 124 are black, or include a black appearance. In other embodiments, the display frame 106, the first layer 122, and the second layer 124 are white, or include a white appearance. Other colors are also possible.

Also, at least some of the aforementioned layers may include a resin material to enhance an adhesive bond between adjacent layers as well as enhance a bond with a structural component to which the masking layer 120 is bonded, such as the protective cover 112 (shown in FIG. 2). Further, in order to create adhesive forces between the structural component and the masking layer 120, the first layer 122 may include a composition having fewer pigments and a greater amount of resin, as compared to the second layer 124. Accordingly, the pigment-to-resin ratio of the first layer 122 is less than that of the second layer 124. Conversely, however, the resin-to-pigment ratio of the first layer 122 is greater than that of the second layer 124. In this regard, the first layer 122 may provide the masking layer 120 with an enhanced adhesive bond with the structural component to reduce or prevent the masking layer 120 from delaminating, or uncoupling, from the structural component in the event of a load or force to the electronic device 100 (shown in FIG. 2). However, the second layer 124 can at least partially compensate for the reduced amount of pigments of the first layer 122.

Also, the masking layer 120 may include additional layers, such as a third layer 126, a fourth layer 128, and a fifth layer 130. Further, the third layer 126, the fourth layer 128, and the fifth layer 130 may increase the opacity of the masking layer 120 to enhance the light-blocking capabilities of the masking layer 120. The third layer 126 and the fourth layer 128 may also include an appearance or color similar to that of the first layer 122 and the second layer 124. In this regard, the same pigmentation used in the first layer 122 and the second layer 124 may also be present in the third layer 126, the fourth layer 128, and the fifth layer 130. However, the composition of pigments and resin material may generally resemble that of the second layer 124 as opposed to the first layer 122. Further, in some instances, the fifth layer 130 includes a pigmentation that provides a darker appearance than the remaining layers. For example, the fifth layer 130 may include pigmentation that provides a gray appearance in order to further enhance the opacity of the masking layer 120. While a discrete number of layers are shown, the masking layer 120 may include a different number of layers. Further, the number of layers of the masking layer 120 may be based in part upon the color selected for the display frame 106.

Figure 4:
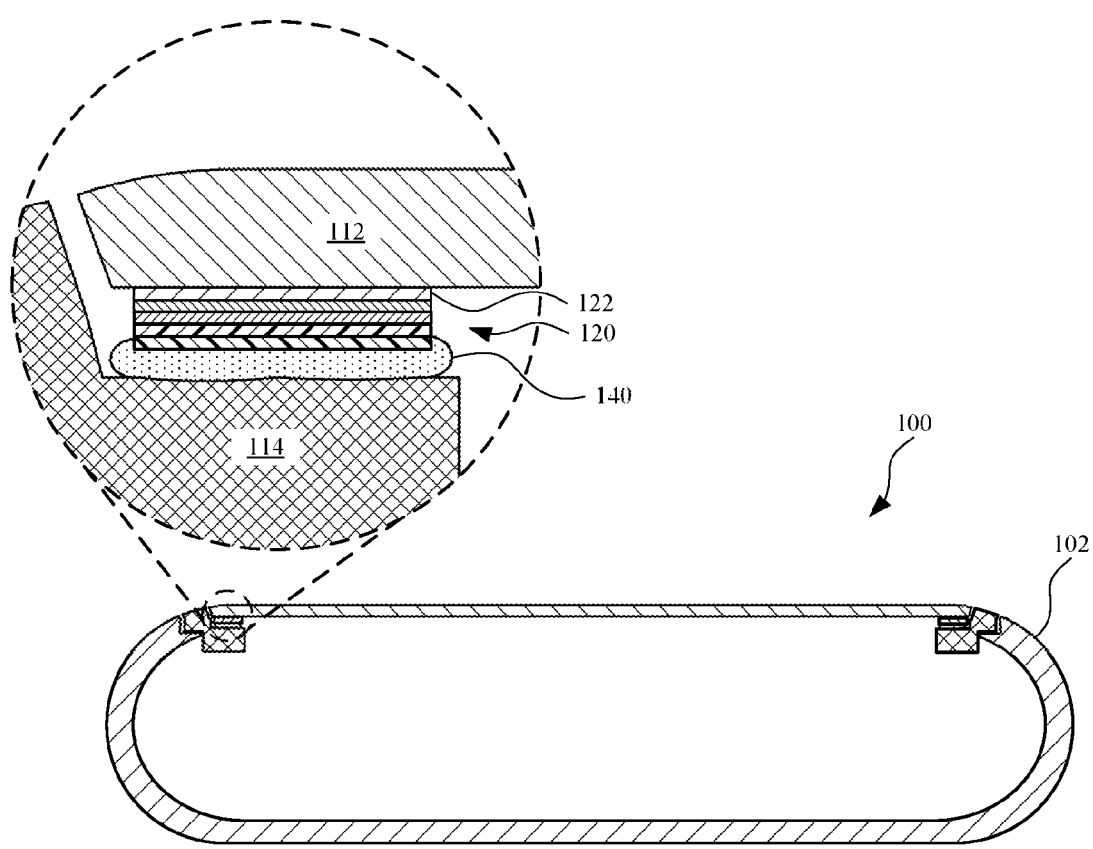
FIG. 4 illustrates a cross sectional view of the electronic device, showing the protective cover adhesively secured with the cover support member.

FIG. 4 illustrates a cross sectional view of the electronic device 100, showing the protective cover 112 adhesively secured with the cover support member 114. Several operational components are removed for simplicity. As shown in the enlarged view, the masking layer 120 may be secured with the protective cover 112 by way of an adhesive bond between the first layer 122 and the protective cover 112. The masking layer 120 may also be bonded with the cover support member 114 by an adhesive layer 140, and the protective cover 112 is secured with the cover support member 114 by way of the masking layer 120 and the adhesive layer 140. As shown, the adhesive layer 140 may engage both the masking layer 120 and the cover support member 114. However, in other embodiments, the adhesive layer 140 extends from the cover support member 114 to the protective cover 112. Also, as shown in the enlarged view, the protective cover 112 may be secured with an the cover support member 114 in a manner such that an exterior surface of the protective cover 112 is co-planar, or approximately co-planar, with respect to an exterior surface of the cover support member 114. Although not shown, the cover support member 114 may be adhesively secured with the enclosure 102.

FIGS. 5-13 show and describe variations and modifications to a cover support member, similar to that of the cover support member 114 shown in FIG. 2. It will be appreciated that electronic device shown in FIGS. 5-13 may include any feature or features previously described for an electronic device 100, shown in FIGS. 1-3.

Figure 5:
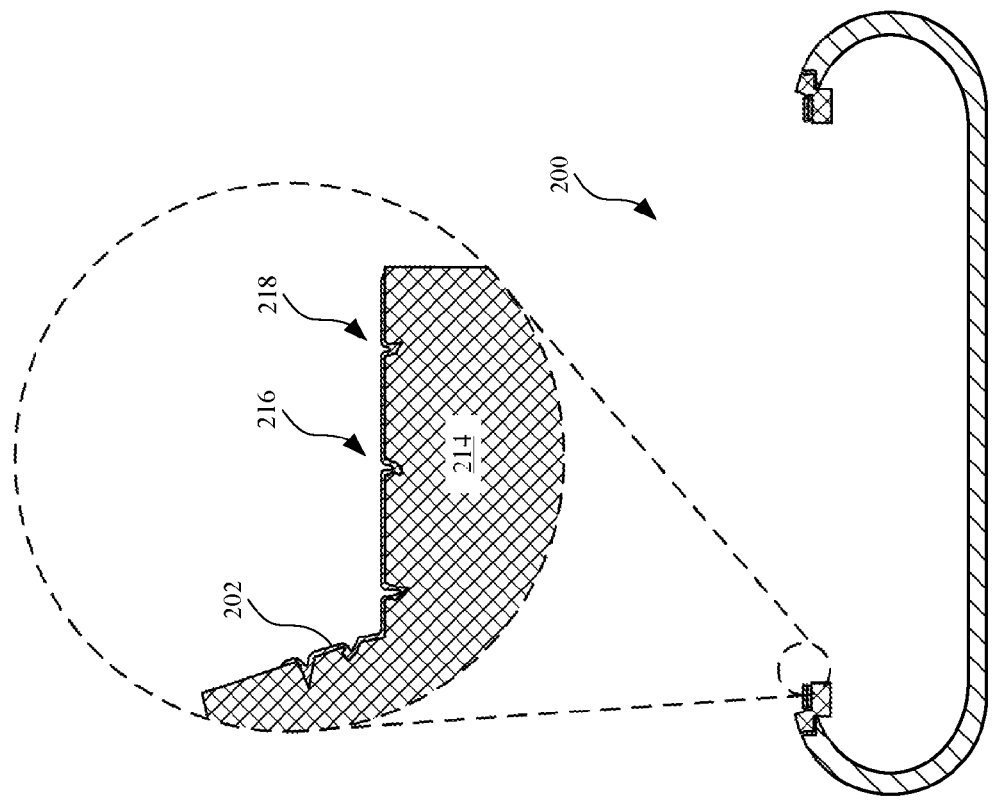
FIG. 5 illustrates a cross sectional view of an electronic device, with a primer agent applied to a cover support member.

Some modifications may increase an adhesive bond between a protective cover and a cover support member, and in particular, between at least one of the layers of material (of a masking layer) and the cover support member. For example, FIG. 5 illustrates a cross sectional view of an electronic device 200, with a primer agent 202 applied to a cover support member 214. The primer agent 202 may increase a surface energy, or surface tension, of the cover support member 214, thereby enhancing a bond between the cover support member 214 and an adhesive applied to the cover support member 214. The primer agent 202 may also change a chemical composition of the cover support member 214 in order to increase the surface energy, or surface tension. Further, the primer agent 202 may also increase the porosity of the cover support member 214. For example, as shown in FIG. 5, the cover support member 214 may include a first porous region 216 and a second porous region 218, both of which are representative of several, additional porous regions (not shown). This may allow an adhesive to extend through the cover support member 214 via the porous regions.

Figure 6:
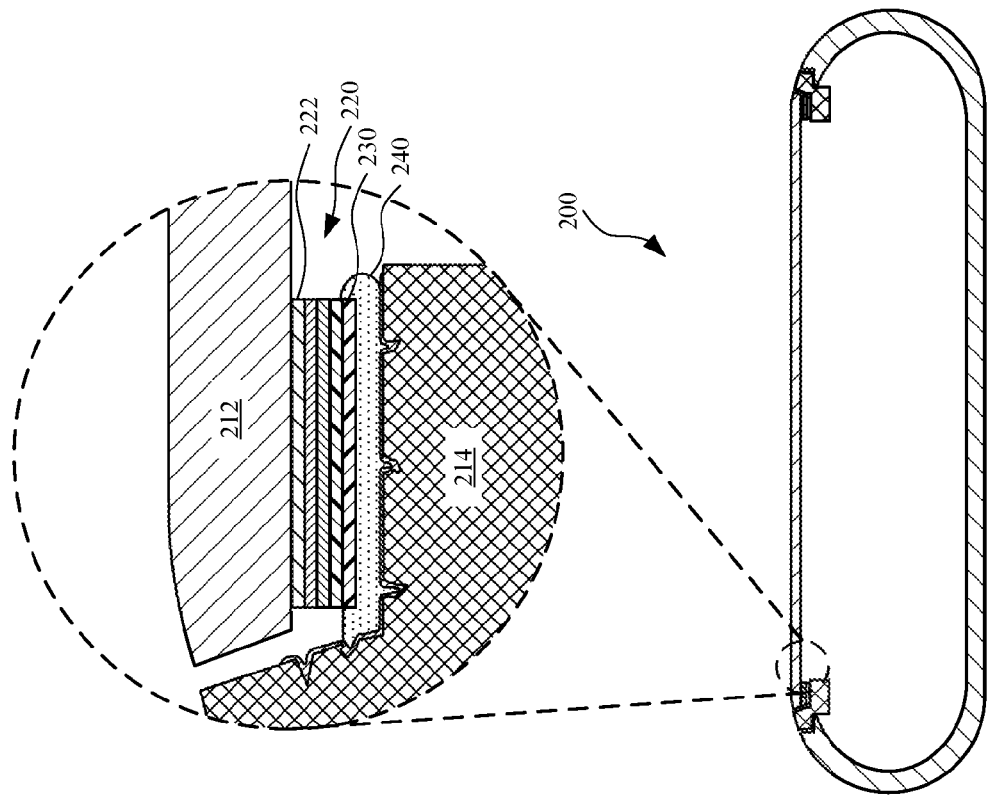
FIG. 6 illustrates a cross sectional view of the electronic device shown in FIG. 5, with a protective cover adhesively secured with the cover support member.

FIG. 6 illustrates a cross sectional view of the electronic device 200 shown in FIG. 5, with a protective cover 212 adhesively secured with the cover support member 214. As shown, the protective cover 212 is secured with the cover support member 214 by way of a masking layer 220 and an adhesive layer 240. The masking layer 220 may include several layers having properties previously described, with an uppermost layer 222 adhesively secured with the protective cover 212 and a lowermost layer 230 adhesively secured with the adhesive layer 240. Also, as shown, the masking layer 220 includes several layers between the uppermost layer 222 and the lowermost layer 230 bonded therewith. As a result of the primer agent 202, the adhesive layer 240 may extend into the porous regions (previously described) of the cover support member 214 such that the adhesive layer 240 is disposed across an increased surface area of the cover support member 214 (as opposed to a planar surface). The additional surface area by which the adhesive layer 240 is bonded allows for an enhanced bond between the cover support member 214 and the masking layer 220, and as a result, a stronger bond is formed between the protective cover 212 and the cover support member 214. This may prevent a delamination between the adhesive layer 240 and the cover support member 214 in the event of a load or force to the electronic device 200. Also, in the event that the protective cover 212 does not include the masking layer 220, the protective cover 212 may be directly secured with the cover support member 214 via the adhesive layer 240.

Figure 7:
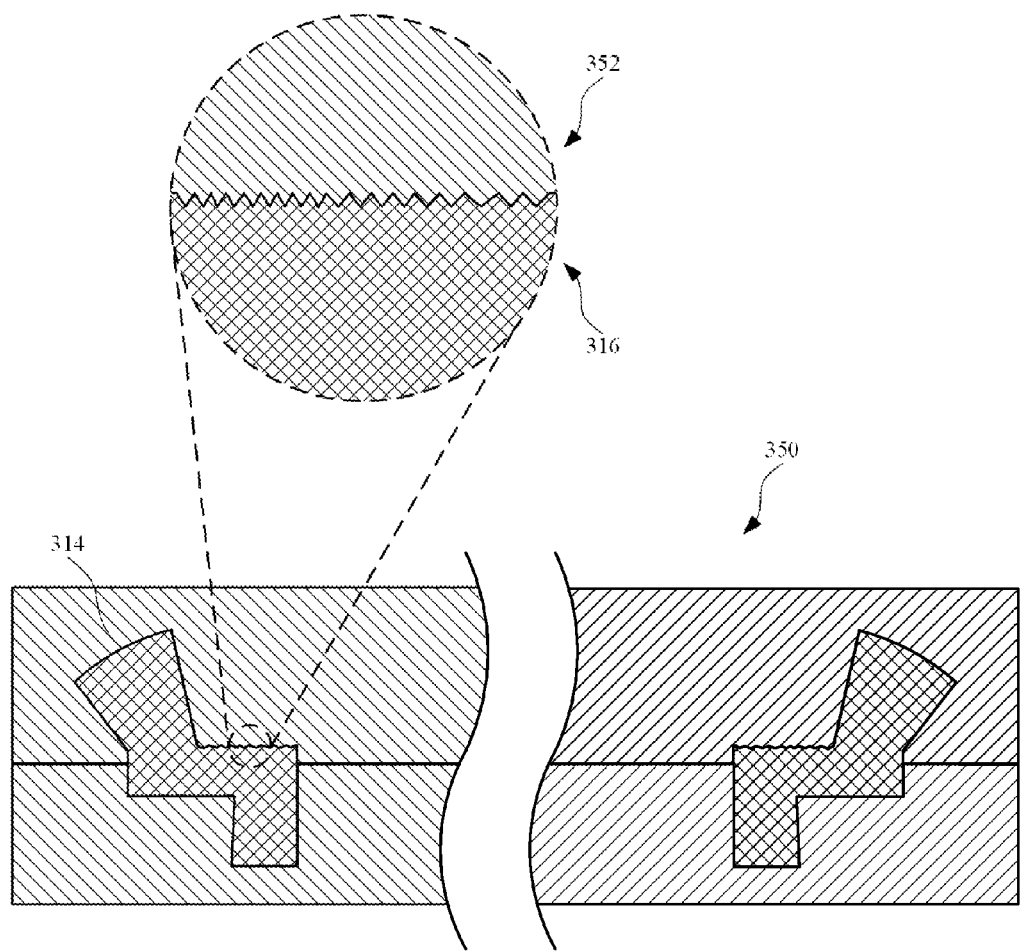
FIG. 7 illustrates a cross sectional view of a cover support member in a molding tool used to mold the cover support member.

Additional or alternate modifications may be made to a cover support member. For example, FIG. 7 illustrates a cross sectional view of a cover support member 314 in a molding tool 350 used to mold the cover support member 314. The molding tool 350 may be designed to receive a polymeric material such that, when cured, forms the cover support member 314 in accordance with the described embodiments. However, as shown in the enlarged view, the molding tool 350 may include a non-coplanar surface 352. The non-coplanar surface 352 may also be referred to as a saw tooth surface having a region of peaks and valleys. Accordingly, when the polymeric material is cured within the molding tool 350, the polymeric material may form a non-coplanar surface 316 having peaks and valleys corresponding to the peaks and valleys of the non-coplanar surface 352 of the molding tool 350.

Figure 8:
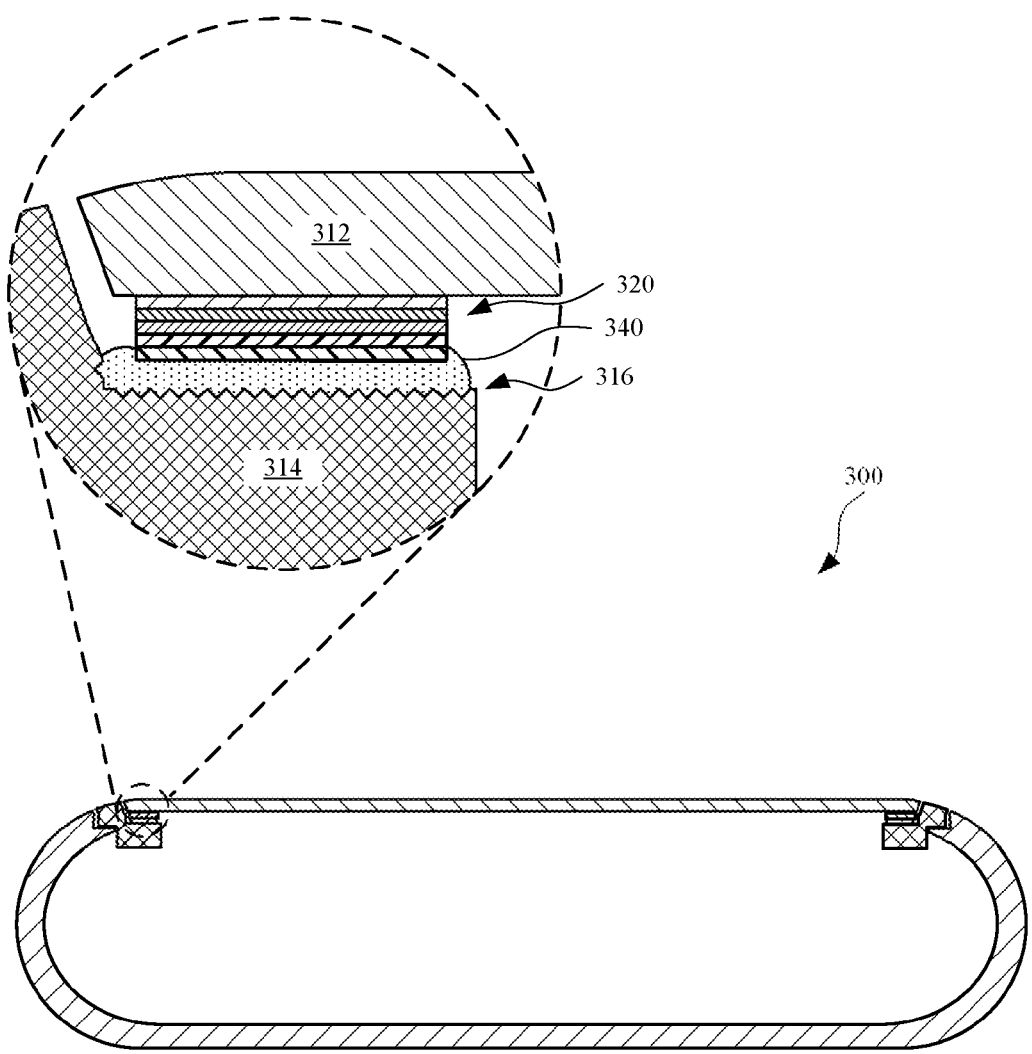
FIG. 8 illustrates a cross sectional view of an electronic device, showing a protective cover adhesively secured with the cover support member formed in FIG. 7.

FIG. 8 illustrates a cross sectional view of an electronic device 300, showing a protective cover 312 adhesively secured with the cover support member 314 formed in FIG. 7. As shown in the enlarged view, an adhesive layer 340 may be disposed positioned between the masking layer 320 and the cover support member 314. As a result of an increased surface area and surface roughness of the cover support member 314, an enhanced adhesive bond between the adhesive layer 340 and the cover support member 314 can be provided (as compared to a flat or co-planar surface of a cover support member). Also, in the event that the protective cover 312 does not include the masking layer 320, the protective cover 212 may be directly secured with the cover support member 314 via the adhesive layer 340.

FIG. 9 illustrates a cross sectional view of an electronic device 400, showing a cover support member 414 having a rib 416 extending from the cover support member 414. The rib 416 may be formed during a molding operation of the cover support member 414 such that the rib 416 is integrally formed with the cover support member 414. The rib 416 may the cover support member 414 with additional surface area, thereby allowing for an additional region to which an adhesive may bond. For example, FIG. 10 illustrates a cross sectional view of the electronic device 400 shown in FIG. 9, further showing a protective cover 412 adhesively secured with the cover support member 414 via a masking layer 420. As shown in the enlarged view, an adhesive layer 440 may extend along a first surface 418, a second surface 422, and a third surface 424 of the rib 416. With the adhesive layer 440 disposed across multiple surface of the rib 416, an enhanced adhesive bond between the adhesive layer 440 and the cover support member 414 may withstand a load or force from multiple directions. For example, the cover support member 414, having an adhesive secured to multiple surfaces of the rib 416, may be able to withstand shearing forces in the direct denoted by a first arrow 442, as well as tensional forces denoted by a second arrow 444. Also, the rib 416 may be formed in a manner such an exterior surface of the protective cover 412 is co-planar, or approximately co-planar, with respect to an exterior surface of the cover support member 414.

Figure 11:
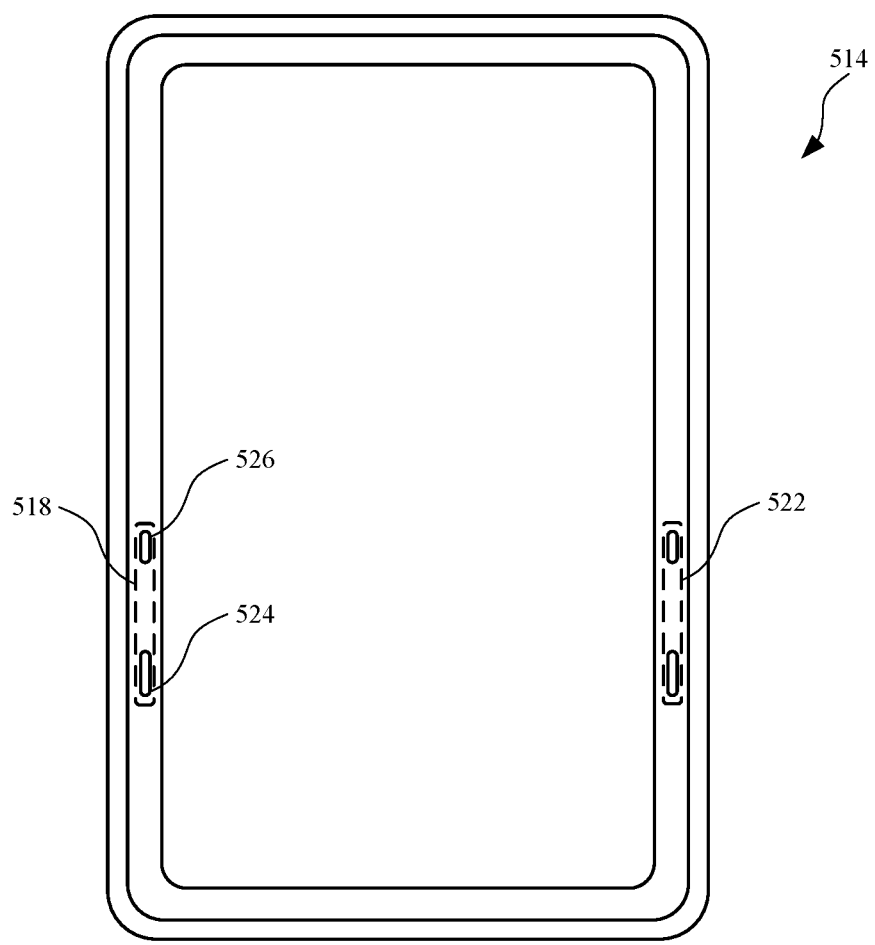
FIG. 11 illustrates a plan view of a cover support member including an attachment feature disposed in the cover support member.

FIG. 11 illustrates a plan view of a cover support member 514 including a first attachment feature 518 and a second attachment feature 522 disposed in the cover support member 514. The first attachment feature 518 and the second attachment feature 522 may be insert molded to the cover support member 514 during a molding operation of the cover support member 514. Also, the first attachment feature 518 and the second attachment feature 522 may be used to secure the cover support member 514 with an enclosure (not shown). FIG. 11 further shows the cover support member 514 having a first opening 524 and a second opening 526. These openings may be referred to as wells, or adhesive wells, that allow for additional adhesive.

Figure 12:
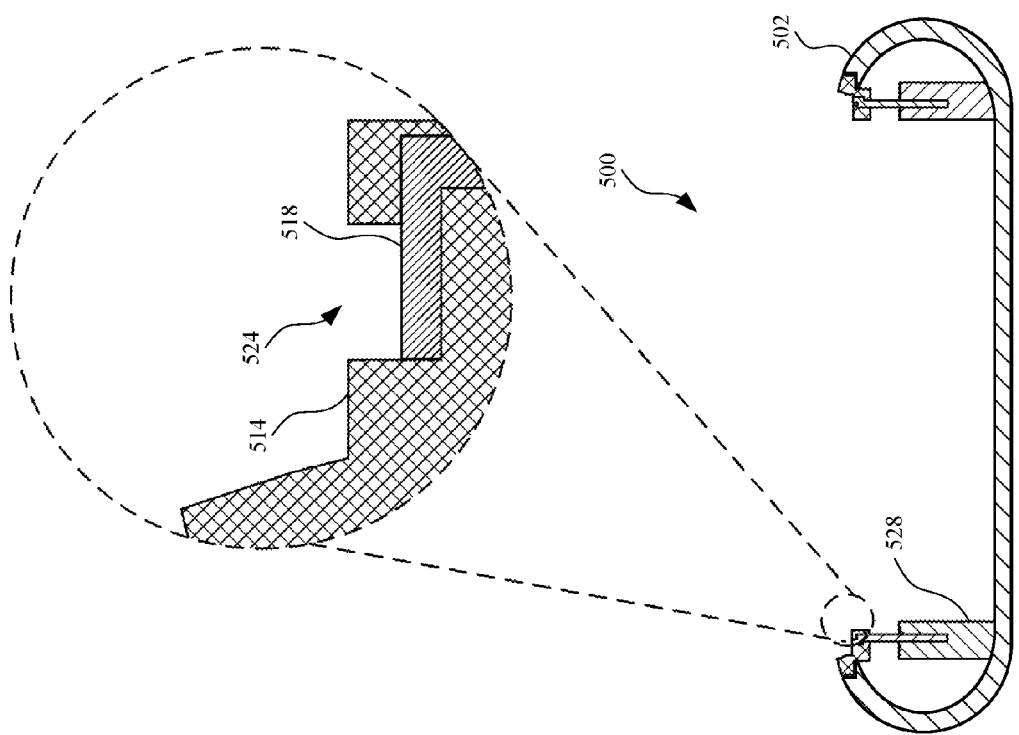
FIG. 12 illustrates a cross sectional view of an electronic device having a cover support member shown in FIG. 11.

FIG. 12 illustrates a cross sectional view of an electronic device 500 having a cover support member 514 shown in FIG. 11. As shown, the first opening 524 of the cover support member 514 may allow a tool (not shown) to extend through the first opening 524 and adjust the cover support member 514 and/or the first attachment feature 518 that extends partially through the first opening 524. Also, the first attachment feature 518 may couple with a first securing feature 528 in order to couple the cover support member 514 with an enclosure 502 of the electronic device 500.

Figure 13:
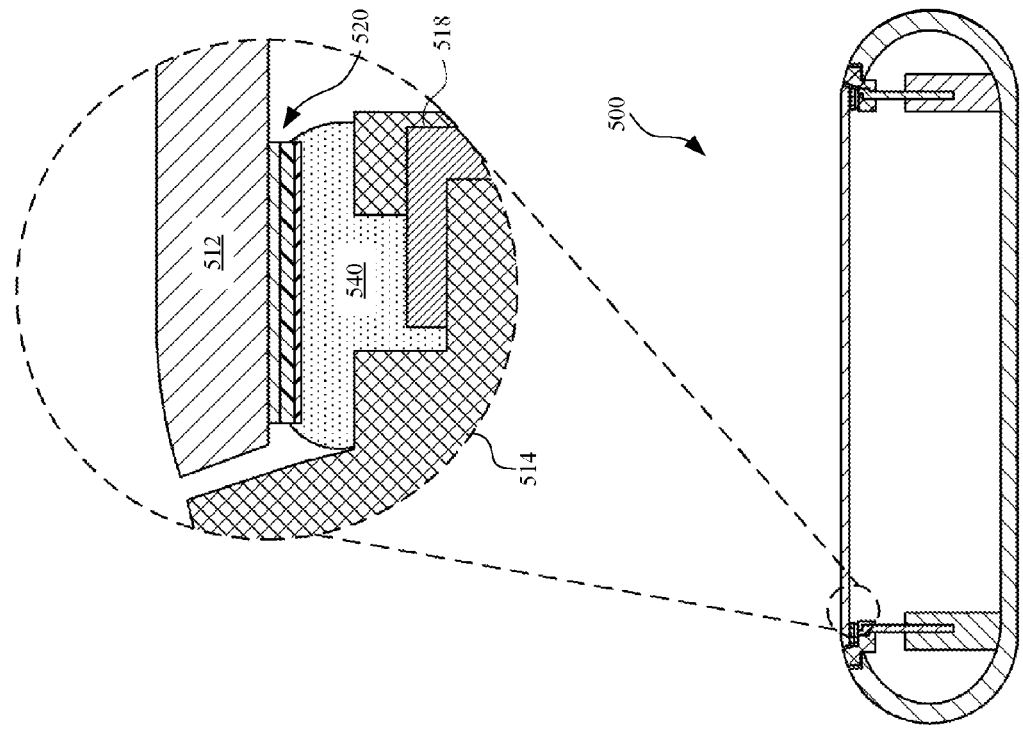
FIG. 13 illustrates a cross sectional view of the electronic device shown in FIG. 12, showing a protective cover secured with the cover support member.

FIG. 13 illustrates a cross sectional view of the electronic device 500 shown in FIG. 12, showing a protective cover 512 secured with the cover support member 514 via a masking layer 520. The first opening 524 (also shown in FIG. 12) may be useful in instances when, for example, the number of layers of the masking layer 520 relatively fewer layers (the masking layer 520 shown as having three layers). For example, a bond line thickness of an adhesive layer 540 may be altered depending upon a change in the number of layers of the masking layer 520. However, the first opening 524 may compensate for such a change. Further, the first opening 524 may allow the adhesive layer 540 to extend into the first opening 524. When cured, the adhesive layer 540 may include an extension defined by the first opening 524. This may allow for an adhesive bond (by the adhesive layer 540) that resists shear (or lateral) and tension forces applied to the electronic device 500.

Figure 14:
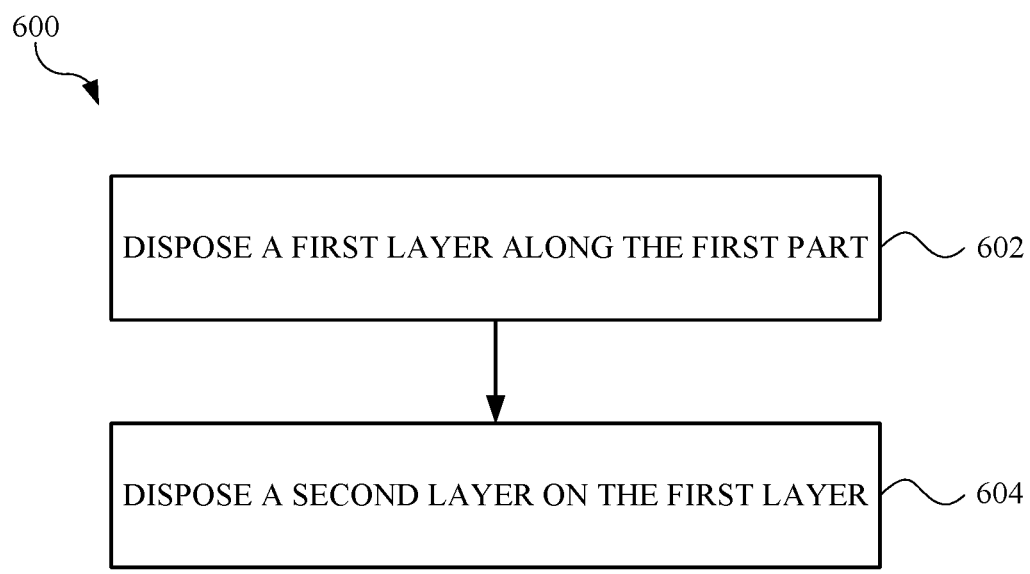
FIG. 14 illustrates a flowchart showing a method for assembling an electronic device, in accordance with the described embodiments.

FIG. 14 illustrates a flowchart 600 showing a method for assembling an electronic device having a first part and a second part, in accordance with the described embodiments. The method may include providing one or more layers to the first part in order to provide a masking layer used to block light from passing between the first part and the second part. Each layer of masking layer may include pigments that define the color of the layer. Also, each layer may include a resin material that causes at least some of the pigments to bond with one another. Further, the resin material of one of the layers is used to provide an adhesive bond with the first part. Moreover, the ratio of resin to pigments of at least one layer may be greater than one or more remaining layers. While the increased resin may reduce the appearance of the layer, in terms of color, the remaining layers may include a ratio of pigments to resin that is higher than that of the layer to enhance the overall appearance, in terms of color, of the masking layer and provide an enhanced light block layer.

In step 602, a first layer is disposed along the first part. The first layer may include a first composition having a first type pigment. The first layer may include an appearance that matches, in terms of color, that of a display frame of the electronic device. The first layer may be applied to the first part by a screen-printing operation. Also, the first composition may include both resin and the first type pigment (or several pigments of the first type). Further, the first composition may include an increase amount of resin, as compared to the remaining layers, in order to provide an enhanced adhesive bond with the first part.

In step 604, a second layer is disposed on the first layer. The second layer may include a second composition having the first type pigment (or several pigments of the first type). Also, the second composition may be different from the first composition. For example, the second composition may include less resin that that of the first layer. However, the second composition may include a greater amount of the first type pigment as compared to the first layer.

The first layer and the second layer can combine to define a masking layer at an interface between the first part and the second part to prevent light transmission through the interface. Also, the masking layer may include several additional layers, some of which may include a composition similar to that of the second composition. Further, at least one of the layers may include a pigment different than the first type pigment such that the layer includes a gray appearance, or some appearance darker than that of the remaining layers.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electronic device, comprising:
a frame member;
a transparent cover carried by the frame member;
a masking layer positioned at an interface between the frame member and the transparent cover, the masking layer comprising:
    a first layer bonded to the transparent cover, the first layer including a first type pigment and a first amount of resin, and
    a second layer that includes the first type pigment and a second amount of resin different from the first amount of resin; and
an adhesive layer that bonds the masking layer with the frame member.

2. The electronic device of claim 1, wherein the frame member comprises a porous region, and wherein the adhesive layer is at least partially disposed in the porous region.

3. The electronic device of claim 1, further comprising:
a display assembly; and
a display frame, wherein the display assembly and the display frame are covered by the transparent cover, and wherein the display frame includes a color resembling a color associated with the first type pigment.

4. The electronic device of claim 1, wherein:
the frame member comprises a rib having a first surface, a second surface, and a third surface, and
the adhesive layer is disposed on the first surface, the second surface, and the third surface.

5. An electronic device having a display assembly and a display frame bordering the display assembly, the electronic device comprising:
a protective cover overlaying the display assembly and the display frame;
a cover support member having a support surface that receives an adhesive layer to secure the cover support member with the protective cover, the support surface having a porous region that receives the adhesive layer; and
a masking layer positioned at an interface between the protective cover and the cover support member to prevent light transmission through the interface.

6. The electronic device of claim 5, wherein the support surface comprises a primer agent disposed on the support surface that alters the support surface to form the porous region.

7. The electronic device of claim 5, wherein the support surface comprises a rib formed on the support surface, the rib including a first surface and a second surface perpendicular to the first surface.

8. The electronic device of claim 7, wherein the adhesive layer is disposed on the first surface and the second surface.

9. The electronic device of claim 8, wherein the rib further comprises a third surface different from the first surface and the second surface, wherein the adhesive layer is disposed on the third surface.

10. The electronic device of claim 5, wherein the support surface comprises a series of peaks and valleys, and wherein the adhesive layer is disposed on the series of peaks and valleys.

11. The electronic device of claim 5, wherein the masking layer is directly secured to the protective cover, and wherein the masking layer comprises:
a first layer including a first composition having a first type pigment, and
a second layer including a second composition having the first type pigment, the second composition different from the first composition.

12. The electronic device of claim 11, wherein:
the first composition comprises the first type pigment and a first amount of resin, and
the second composition comprises the first type pigment and a second amount of resin less than the first amount of resin.

13. A method for assembling an electronic device having a first part and a second part secured with the first part, the method comprising:
disposing a first layer along the first part, the first layer including a first composition having a first type pigment;
disposing a second layer on the first layer, the second layer including a second composition having the first type pigment, the second composition different from the first composition, wherein the first layer and the second layer combine to define a masking layer at an interface between the first part and the second part to prevent light transmission through the interface; and
providing a display frame that includes a color resembling a color associated with the first type pigment.

14. The method of claim 13, wherein disposing the masking layer comprises:
forming the first composition with the first type pigment and a first amount of resin, and
forming the second composition comprises the first type pigment and a second amount of resin less than the first amount of resin.

15. The method of claim 13, further comprising:
forming a porous region on the second part; and
applying an adhesive layer to the second part, wherein the adhesive layer is at least partially disposed in the first part.

16. The method of claim 13, further comprising:
   forming a series of peaks and valleys on the second part; and
   applying an adhesive layer to the second part, wherein the adhesive layer is at least partially disposed on the series of peaks and valleys.

17. The method of claim 13, where the first part comprises a cover glass, and wherein the second part comprises a frame member.

18. The electronic device of claim 1, further comprising an enclosure that secures with the frame member, the enclosure defining an internal volume that carries operational components.

19. The electronic device of claim 1, wherein:
   the first amount of resin is greater than the second amount of resin,
   the first layer provides a first adhesive bond, and
   the second layer provides a second adhesive bond that is less than the first adhesive bond.

20. The electronic device of claim 1, wherein the masking layer further comprises:
   a third layer bonded to the second layer;
   a fourth layer bonded to the third layer, wherein the third layer and the fourth layer include the first type pigment; and
   a fifth layer bonded to the fourth layer and the frame member, the fifth layer comprising a pigment type different from the first type pigment.

* * * * *